United States Patent
Krause et al.

[11] Patent Number: 5,886,313
[45] Date of Patent: Mar. 23, 1999

[54] LASER DIODE ARRAY DEVICE FOR BONDING METAL PLATES

[75] Inventors: Volker Krause, Kirchheimbolanden; Konrad Wissenbach, Herzogenroth-Kohlscheid; Eckhard Beyer, Roetgen-Rott; Hans-Georg Treusch; Gilbert Vitr, both of Aachen, all of Germany

[73] Assignee: Fraunhofer-Gesellschaft zur Foerderung der angewandten Forschung e.V., Munich, Germany

[21] Appl. No.: 793,254

[22] PCT Filed: Aug. 21, 1995

[86] PCT No.: PCT/DE95/01126

§ 371 Date: Jun. 5, 1997

§ 102(e) Date: Jun. 5, 1997

[87] PCT Pub. No.: WO96/05937

PCT Pub. Date: Feb. 29, 1996

[30] Foreign Application Priority Data

Aug. 23, 1994 [DE] Germany ............... 44 29 913.3

[51] Int. Cl.⁶ ................................................. B23K 26/00
[52] U.S. Cl. ......................................................... 219/121.6
[58] Field of Search ..................... 219/121.63, 121.64, 219/121.85, 121.73, 121.75, 601, 617

[56] References Cited

U.S. PATENT DOCUMENTS

| | | | |
|---|---|---|---|
| 4,744,615 | 5/1988 | Fan et al. .......................... | 219/121.77 |
| 4,912,297 | 3/1990 | Beyer et al. ...................... | 219/121.63 |
| 4,963,714 | 10/1990 | Adamski et al. ................. | 219/121.63 |
| 5,068,515 | 11/1991 | Van der Bergh et al. ......... | 219/121.73 |
| 5,306,890 | 4/1994 | Minamida et al. ................ | 219/121.64 |
| 5,414,559 | 5/1995 | Burghardt et al. ................ | 359/619 |
| 5,548,444 | 8/1996 | McLaughlin et al. ............. | 359/629 |
| 5,705,788 | 1/1998 | Beyer et al. ...................... | 219/121.83 |

FOREIGN PATENT DOCUMENTS

| | | | |
|---|---|---|---|
| 0 282 593 A1 | 9/1988 | European Pat. Off. . | |
| 4234342 | 4/1994 | Germany . | |
| 64-22482 | 1/1989 | Japan ............................... | 219/121.85 |
| 2-247096 A | 10/1990 | Japan . | |
| 4-258390 A | 9/1992 | Japan . | |
| WO 94/17576 | 8/1994 | WIPO . | |

Primary Examiner—Geoffrey S. Evans
Attorney, Agent, or Firm—Evenson, McKeown, Edwards & Lenhan, P.L.L.C.

[57] ABSTRACT

A device for plating two or more metal plates, strips, etc., by the absorption of laser energy. The device is fitted with beam-forming optics which form the laser radiation into a beam with a rectangular cross-section. The radiation source is a laser-diode array in which several laser diodes are disposed next to each other in the same plane to give bars which can be laid next to each other, as well as stacked one on top of each other, in any numbers. In order to homogenize the laser radiation produced by the array to give a rectangular cross-section, the device proposed is fitted with special optics such as a prism which converges in the shape of a wedge, a glass plate, with a rectangular cross-section, reflective boundary drives, etc. The rectangular cross-section beam heats the two surfaces of the metal plates being plated only locally, over limited areas and to small depths, to the plastic state. In addition, sensors and control devices for control of the power of the laser-diode array and/or for changing the speed of advance of the metal plates being plated may be used.

36 Claims, 12 Drawing Sheets

LASER DIODE ARRAY DEVICE FOR BONDING METAL PLATES

BACKGROUND AND SUMMARY OF THE INVENTION

The invention relates to a device for bonding two or more metal plates, strips, and the like by absorption of energy from laser radiation, provided by beam-forming optical means.

Devices for bonding are known of themselves. In bonding operations, high-quality coating materials that possess particular chemical, physical, or mechanical properties are bonded with inexpensive base materials that contribute strength. It is necessary to achieve a strong metallic connection between the coating material and the base material. In the past this has been accomplished by squeezing the coating material onto the base material in a plastic state. The energy required for this purpose is applied for example by rolling or explosions in the bonding zone.

Bonding is used to produce semifinished products composed for example of two or more metal layers bonded together by the methods of cold-roll bonding, hot-roll bonding, explosive bonding, or a combination of these bonding methods. The semifinished products are therefore called bonded materials and belong to the class of layer bonded materials. The metal layers of the coating material and base material are usually much thicker than those employed in conventional surface treatment methods. In bonded layered materials the technical and economical properties of their components are combined in such fashion that suitability for the purpose is obtained that is superior to that of the individual materials.

In hot-roll bonding or cold-roll bonding, average to high rolling pressures on the order of $10^2$ N/mm$^2$ or $10^4$ N/mm$^2$ are used. The sheet widths that can be bonded in this fashion are less than 0.6 m. In explosive bonding, an explosive pressure of $10^5$–$10^6$ N/mm$^2$ is used. Important disadvantages of explosive bonding however include the wavy structure of the bonding zone between the coating material and the base material and a sheet width of 3 meters or more.

One disadvantage of cold rolling bonding and hot rolling bonding is the fact that only metal plates with widths up to 60 cm can be processed. In addition, in hot-roll bonding and cold-roll bonding, the high roller pressures already mentioned must be used, resulting in a corresponding cost of machinery and energy. In the hot-roll bonding method, the coating material and base material are heated to 1200° C. so that a change takes place in the metallurgical and mechanical properties of the materials.

A device and a method for bonding using laser radiation is known from German Patent 37 13 975. The device disclosed therein and the corresponding method are proposed in particular for welding the edges of workpieces, but are also intended to perform bonding of layered materials. In German Patent 37 13 975 the device uses laser radiation that is particularly suited for heating the surfaces of two layered materials fitted together at a V-shaped gap. This laser radiation runs essentially parallel to the plane of the gap of the joint and perpendicular to the line of the joint. In addition, the laser radiation oscillates primarily parallel to the plane of the gap of the joint. According to the subject of German Patent 37 13 975, the surfaces of the two materials to be joined are brought closer and closer together to produce the joint. A welded seam extends from this joint, with the surfaces of the materials to be joined being welded together in the vicinity of the welded seam by the melting of the materials. The surfaces of the materials are brought together by applying pressure in the vicinity of the joint. In the area of the joint itself, the surfaces of the materials abut one another with practically zero pressure so that the molten material of the two material surfaces is under practically no joining pressure. The method for joining two metal layers according to German Patent 37 13 975 makes sense for welding but not for bonding involving two metal layers. In bonding, the surfaces of the two metal layers to be joined are not heated to the melting point, and the temperature is deliberately kept below the melting point of the workpieces to be joined since bonding takes place only when the materials to be joined are in the plastic and not the molten state. In addition, during the bonding process the heated zones of the surfaces of the two metal layers to be joined are pressed directly against one another by rollers in order to produce a bond between the two surfaces. It is not possible in bonding to allow the heated zones of the two metal layers to be joined to rest against one another at the joint with zero pressure, as is the case in the subject of German Patent 37 13 975.

In the subject of German Patent 37 13 975, a $CO_2$ laser is used as the source of laser radiation. In a $CO_2$ laser, the power requirement for a bonding width of about 1 cm is currently between 1–4 kW depending on the process and the materials used. For a bonding width of more than 1 meter, laser powers greater than 100 kW are required, which cannot be produced using the laser systems that are currently available. In addition, bonding of metal layers must be performed without local melting of the surfaces of the two material surfaces to be joined. This imposes extreme demands on the homogeneity of the power density distribution at the joint. In $CO_2$ lasers, homogenization is produced by beam-forming optics and/or vibrating mirrors. Homogenization will be very difficult for example by using faceted mirrors for technical reasons (Fresnel number) for the wavelength of the $CO_2$ laser. If metal plates more than 1 meter wide are to be joined by bonding, a considerable technical and equipment cost is also required that entails correspondingly high costs to achieve homogenization of the power density distribution at the joining point of the two surfaces.

U.S. Pat. No. 5,306,890 teaches a device for welding a smooth metal sheet and a corrugated metal sheet. These two sheets are welded together, with the smooth sheet serving as the support for the corrugated structure of the other sheet. The welded product thus produced is used in catalytic converters fitted to automobiles with internal combustion engines. The width of the support with the corrugated sheet must not be less than 160 mm. A YAG laser or a $CO_2$ laser is used for welding. Beam-forming means are provided for the laser beam, so that the metal sheets to be bonded are irradiated along the joint line over their entire lengths. The two metal sheets are heated in the vicinity of the joint line and squeezed together by two rollers at the joint line. The thickness of the two metal sheets is between 50 microns and 1 millimeter. The laser beam is extended over the entire joint line by using a mirror suitably designed according to the prior art. U.S. Pat. No. 5,306,890 is a welding method to which the subject of the present application is not directed.

The subject of DE-OS 43 01 689 is a semiconductor laser system that comprises a plurality of semiconductor laser units, each of which has a coupling element that couples the laser radiation of the respective semiconductor laser unit into a light-conducting fiber and a fiber bundle comprising the fibers as a light guide system that has one end from which a total laser radiation composed of the combined laser radiation created by the semiconductor laser units emerges, said total laser radiation illuminating a target area on an object to be irradiated when all the semiconductor laser units are engaged in laser activity. A control is provided with which the power of each individual semiconductor laser unit can be controlled in a specific fashion, and for control purposes the irradiation of different surface elements of the target surface can be defined with an intensity that can be set individually for each surface element. For control, an irradiation profile that varies in time and/or space can be preset for the target area. The subject of DE-OS 43 01 689 can be used to perform irradiation tasks such as irradiating different surface elements within the target surface at different intensities and thus adapting the radiation on surface areas of the target surface to the desired brightness. The total laser radiation is not produced by one laser system but by a plurality of semiconductor laser systems, thus permitting complex irradiation by specific control of the power of the individual semiconductor laser units.

In one embodiment of the semiconductor laser system, in addition to the fiber bundles, additional detector fibers are provided for illumination that are located in the end area, with their fiber end surfaces arranged in a regular fashion between the fiber end surfaces for illumination, so that the additional detector fibers produce an image of the fiber end surfaces on the target surface takes place in the same manner as in the fiber end surfaces for illumination. The ends of the additional detector fibers opposite the fiber end surfaces terminate in a detector matrix that detects the received radiation individually for each additional detector fiber. With this detector matrix, therefore, an image of the target area can be obtained and an image of the target surface can be displayed on a screen by means of a corresponding image processing unit. For this purpose, a number of additional detector fibers are worked into the fiber bundle for illumination such that a sufficiently accurate representation of an image of the irradiated target surface on the screen is possible and thus allows exact observation of the irradiated surface areas of the target surface. Measures for homogenizing the power density distribution of the laser radiation are not provided in the subject of DE-OS 43 01 689.

A method is known from JP 2-247096 A for rendering uniform the intensity of laser radiation, and is not described in greater detail. For this purpose, the laser beam is conducted via a mirror into a device that displaces the optical axis. This radiation is conducted through a lens into a calite scope where it is reflected several times. This multiple reflection results in the power density distribution of the laser beam being rendered uniform. A welding method for stainless pipe is known from JP 4-258390 A. A laser beam not defined in greater detail is used for welding. Before the two edges of the sheet are welded together to form a pipe, these ends or the entire pipe are/is preheated using an electrical system that uses high frequency. This produces a uniform weld.

Hence, the goal of the invention is to provide a device for bonding at least two metal plates, strips, or the like, which in particular can bond plate widths of the coating material and base material that can be even wider than 1 meter, said device also meeting the highest requirements for homogeneity of the power density distribution at the joint, said device permitting minimization of the changes in the metallurgical and mechanical properties of the metal plates to be bonded, which prevents melting during bonding and failure of the two surfaces to be joined, which permits a reduction of the roller pressure on the two metal plates to be joined, and finally allows a reduction of the energy required for bonding the two metal plates to be joined.

The advantages of the invention consist in particular in that by using a radiation source that is formed by an arrangement of laser diodes, as a result of the far higher electrical and optical efficiency of the laser diodes, an energy saving of five to six times is possible by comparison with bonding using a $CO_2$ laser with approximately the same degree of absorption. Another very important advantage of the invention consists in that, in order to homogenize the power distribution of the laser beam at the joint, along the entire length of the joint line according to the invention glass plates with total reflection for the laser beam passing through or prisms joined wedgewise, likewise with total reflection in the prism for the laser beam passing through, or a very dense arrangement of laser diodes extending lengthwise and stacked above one another in several planes with laterally applied reflecting limiting devices or special light guide fiber bundles are used. By placing the glass plates, prisms, or reflecting limiting surfaces or special light guide fiber bundles between the laser beam source and the cylindrical lens that focuses to a rectangular beam cross section, a very high homogeneity of the power density distribution can be achieved over the entire length of the rectangular focus or joint line that cannot be achieved with conventional bonding methods or even with a $CO_2$ laser beam that moves back and forth over a width of more than 1 meter. By virtue of the special arrangement of the laser diodes in laser diode bars that can be lined up side by side as desired, and which also can be stacked vertically, with the aid of the cylindrical lens a laser radiation can be achieved with a rectangular beam cross section that heats only locally limited zones of limited spatial depth at the two surfaces of the metal plates to be bonded in the V-shaped gap between the surfaces of the metal plates to be bonded. As a result of the limited spatial depth of the heating at the joint, it is possible to achieve a very low change in metallurgical and mechanical properties of the two metal plates to be bonded, in other words the surface material and the base material. In addition, the uniform power density distribution of the laser radiation with a rectangular beam cross section as well as measurement of the laser end or heat radiation provided at the joint makes it possible to generate a regulating signal to change the feed rate of the metal plates and/or the laser power, to avoid melting of the surfaces of the two metal plates to be joined, and always to maintain a plastic state of the materials that allows optimum joining of these two surfaces. As a result of this exact control of the plastic state of the surfaces of the two metal plates to be joined, rolling pressures that are low by comparison with hot- and cold-roll bonding are required to press together the two metal plates to be joined. As a result, only low degrees of deformation take place, resulting in a reduction of the solidification in the bonding zone between the two metal plates to be joined. By virtue of the special arrangement of the laser diodes arranged side by side in laser diode bars, widths of more than one meter for the metal plates to be joined can be achieved at any time without additional technical measures. The high laser power required for a corresponding application can be varied as desired by stacking these laser diode bars made of rows of diodes, one on top of the other.

The invention will now be described with reference to embodiments and drawings.

BACKGROUND AND SUMMARY OF THE INVENTION

FIG. 6 is a schematic diagram of a second device for bonding according to the invention, with the complete laser diode arrangement being provided with a rectangular glass plate to allow the laser radiation to pass through;

DETAILED DESCRIPTION OF THE DRAWINGS

Figure 1:
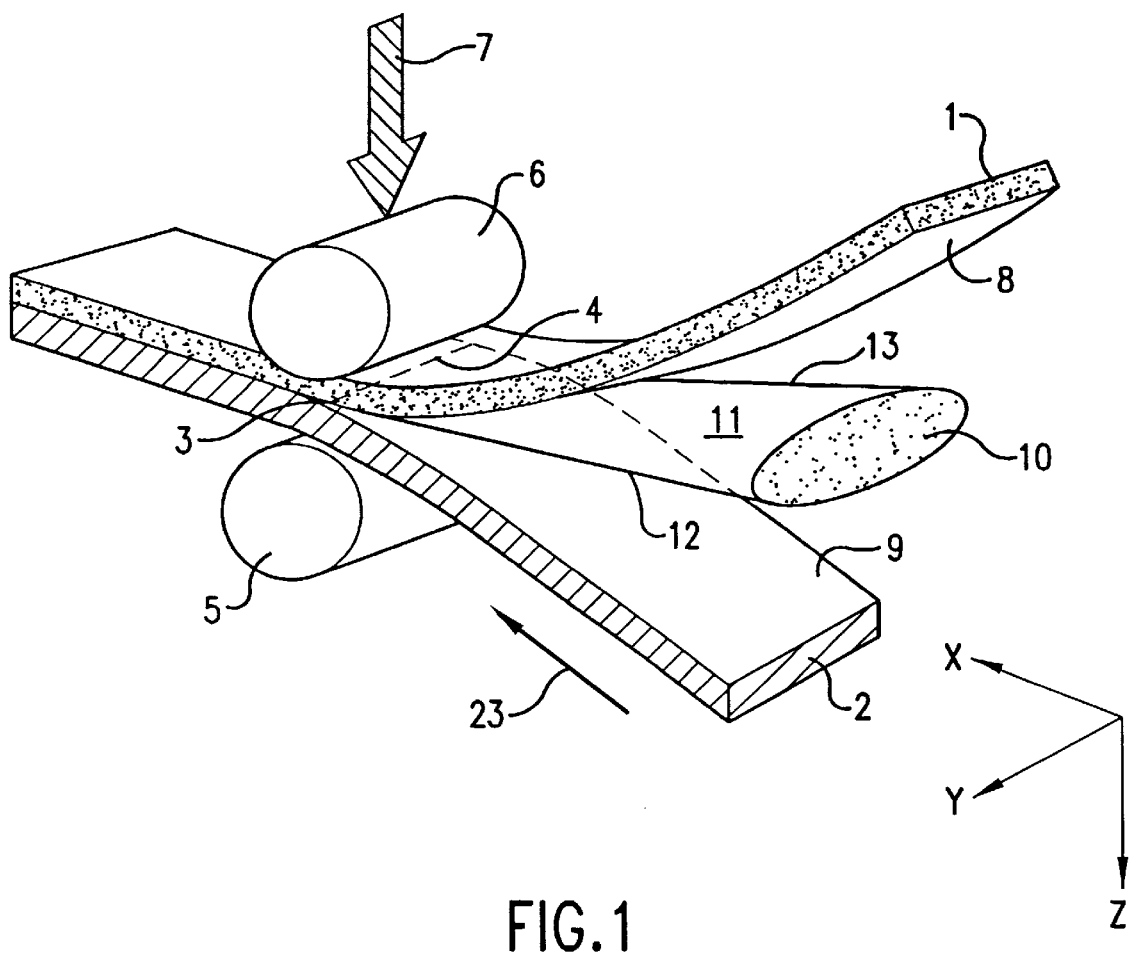
FIG. 1 is a schematic and partial representation of a device according to the invention for bonding two strip-shaped metal plates.

FIG. 1 shows a schematic and partial representation of the bonding device according to the invention. In FIG. 1, only the principle of bonding is shown, in other words the laser beam source, the rolling device, and all of the other devices required for bonding have been omitted for the sake of clarity and only a partial view of the elements that are most important to the invention is presented. For example, two metal plates 1 and 2 are to be bonded. These metal plates can be several millimeters to several centimeters thick and can be made in the form of large-format metal surfaces more than 1 meter wide, as metal strips, and the like. In the diagram in FIG. 1, two metal plates 1, 2 in the shape of strips are bonded, with metal plate 1 being the coating material and metal plate 2 the base material. Metal plates 1 and 2 are brought together at a joint 3. A joint line 4 that runs in the direction of the y coordinate marks the joint 3 over the entire width of the surfaces to be bonded, with joint line 4, depending on the requirements, possibly extending over a width of several meters of the surfaces 8, 9 of metal plates 1, 2 to be joined.

Bonding of the two metal plates 1, 2 takes place firstly under the assumption of an exertion of pressure by rollers 5 and 6 that belong to a rolling device not shown in FIG. 1. With these rollers, a pressure is applied to metal plates 1 and 2, with rolling force 7 exerted in the direction of the z coordinate directly at joint 3 or joint line 4.

The other assumption regarding bonding is a heating of surface 8 of metal plate 1 and surface 9 of metal plate 2, as the two metal plates to be joined, in an area a short distance ahead of joint 3 or joint line 4. In the bonding device according to the invention this heating is produced by the absorption of laser radiation 10 generated by laser diodes. Nonpolarized or polarized laser radiation can be used for this purpose. The radiation sources, described in greater detail below, that constitute a total laser system 25 utilize for this purpose beam-forming optical means that shape laser radiation 10 into a beam with a rectangular beam cross section 22. Laser radiation 10 with rectangular beam cross section 22 is aimed at joint 3 in such fashion that rectangular beam cross section 22 coincides with joint line 4. Laser radiation 10 also coincides with gap plane 11 as indicated by the boundary lines 12 and 13 of laser beam 10. The gap plane runs in the middle of a V-shaped gap that is formed by the two metal plates 1 and 2 before they are pressed together by rollers 5 and 6. Laser radiation 10 is also perpendicular to joint line 4. By aiming rectangular beam cross section 22 at joint line 4 and aiming laser radiation 10 vertically at joint line 4, laser radiation 10 reaches the bottom of the V-shaped gap and is uniformly distributed. Since the extent of rectangular beam cross section 22 is relatively short in the z direction, this means that only a small zone immediately ahead of joint line 4 on the two surfaces 8 and 9 of metal plates 1 and 2 is heated, with the temperatures of surfaces 8 and 9 of metal plates 1 and 2 being controlled in such fashion that a plastic state of the two surfaces is achieved while the temperature remains significantly below the melting point of the two metal plates to be joined. If, on the other hand, polarized laser radiation is used, laser radiation 10 oscillates at joint 3 predominantly parallel to gap plane 11 or the x-y plane. Then the degree of reflection of the laser radiation can be controlled by this polarization. If laser radiation 10 oscillates parallel to gap plane 11, reflection at high angles of incidence is very high as compared with laser radiation 10 that oscillates perpendicularly to gap plane 11. Therefore, laser radiation 10 that oscillates parallel to gap plane 11, because of the slight dependence of its reflection on the angle of incidence, for the most part will reach down to joint 3 or joint line 4 or into the area immediately in front of them so that most of the absorption will take place there. The good concentration of laser radiation 10 polarized parallel to gap plane 11 at joint 3 or joint line 4 at the bottom of the V-shaped gap in the two metal plates 1 and 2 permits precise heating of the two surfaces 8 and 9 to be bonded in the plastic state. Measurement and regulating methods for nonpolarized and polarized laser radiation will be described later on.

Figure 2:
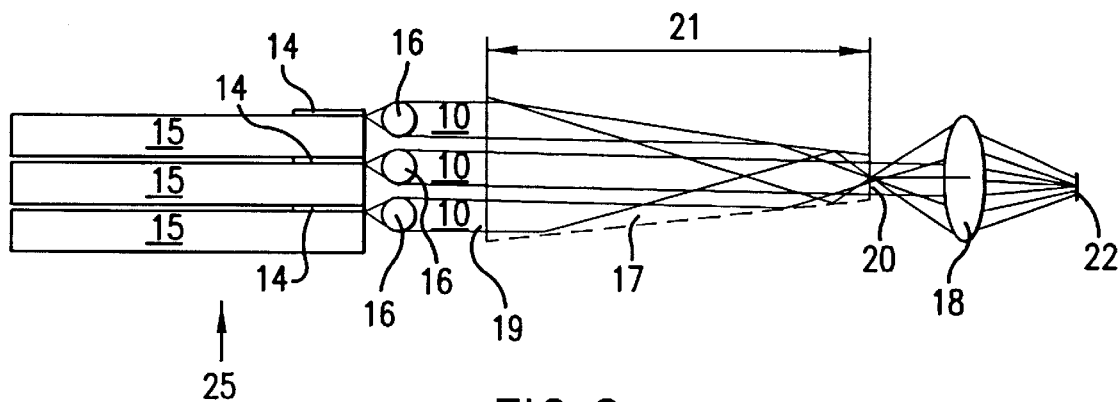
FIG. 2 is a side view showing as the radiation source, a laser diode arrangement with a prism that tapers wedgewise in a first embodiment according to the invention.
Figure 3:
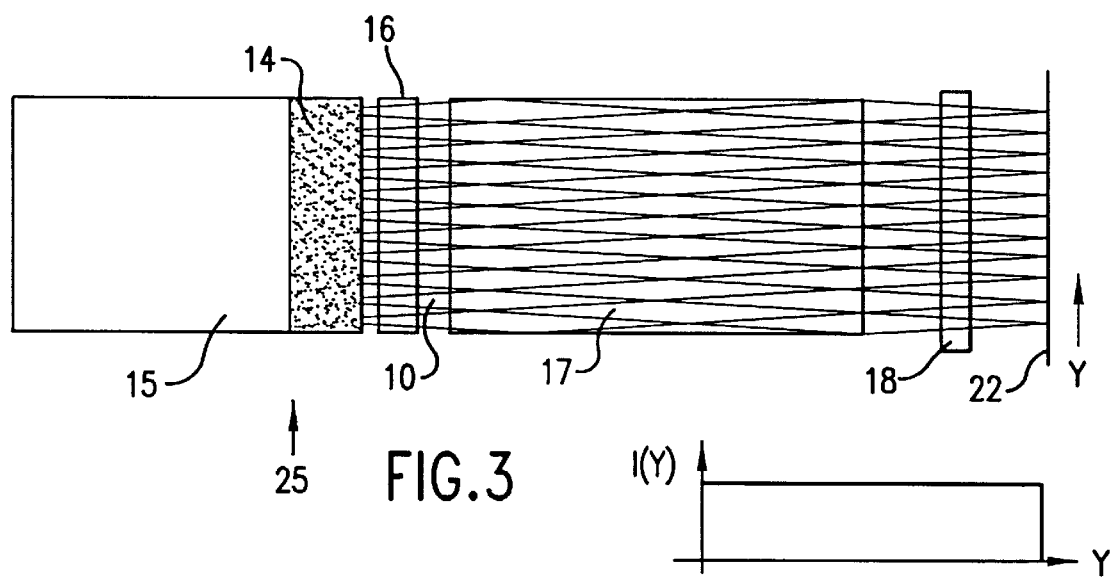
FIG. 3 is a top view of FIG. 2.
Figure 3A:
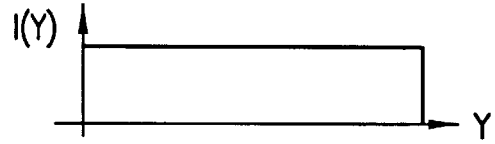

FIGS. 2 and 3 show, as part of a first embodiment according to the invention, in a side view and a top view, a radiation source that consists of a laser diode system. Laser diodes have important advantages. The lifetimes of laser diodes are greater than 2000 hours. Laser diodes require no maintenance and their efficiency is 30 to 50%. The ratio of the wattage that can be achieved to the laser volume in the case of laser diodes is 1000 W per $cm^3$ of laser volume.

FIGS. 2 and 3 show laser diode bars 14 formed of laser diodes. A cooling element 15 that acts as a heat sink is associated with each laser diode bar 14. A laser diode bar 14 of this kind is 10 mm long, 0.6 mm wide, and 0.1 mm tall, for example. On the long side of an individual laser diode bar 14, 800 individual laser diodes can be located side by side in a plane to form a laser diode bar. The laser diodes of this laser diode bar can have a power of about 50 W. Cooling element 15 for example is 0.3 to 2 mm thick. In the cooling element, openings can be provided for a liquid or gaseous coolant to carry away the operating heat. If these laser diode bars 14 or cooling elements 15 are stacked on top of one another, a packing density of up to 25,000 individual laser diodes per cm² can be achieved. Each individual laser diode has a beam area of about 1 to 3 mm². Because of this small radiation area, the emitted laser radiation has a large divergence angle and is typically 30° to 100° in the plane perpendicular to the active laser diode layer and less than 30° in the plane parallel to the active laser diode layer.

The laser diode bars 14 composed of laser diodes as described above can be lined up in any length side by side on a plane, with the lengths of the laser diode bars 14 in a plane being defined by the individual application and being capable of reaching lengths of several meters. In addition, laser diode bars 14 lined up on a plane can be stacked on top of one another as desired. This forms a complete laser diode system 25 that can achieve a very high total power. Thus, a fully homogeneous power density distribution with a high power of laser radiation 10 and a considerable extent in the y direction can be achieved as is necessary as a rule for bonding metal plates.

Laser radiation 10 that is emitted on each individual plane, with laser diode bars 14 composed of laser diodes lined up side by side, is picked up by a common cylindrical microlens 16 in bar form and transmitted as parallel radiation. The laser radiation 10 that is emitted on each plane from laser diode bars 14 composed of laser diodes arranged side by side is therefore picked up for collimation by cylindrical microlenses 16, with said cylindrical microlenses being arranged perpendicularly to the actively radiating surface above the laser diodes. For each plane with laser diode bars 14 therefore a separate cylindrical microlens 16 is provided, with microlenses 16 being made continuous over the entire length of the laser diode bars 14 or segmented to form individual sections of cylindrical microlenses 16 mounted side by side. The length of cylindrical microlenses 16 in bar form thus corresponds to at least the total length of laser diode bars 14 in this plane. Cylindrical microlenses 16 are followed by a prism 17 that tapers wedgewise in the direction of joint 3 of metal plates 1, 2 to be bonded. Prism 17 that tapers wedgewise to joint 3 is designed so that the entrance aperture 19, the exit aperture 20, and the length 21 of the prism itself are dimensioned so that the laser radiation 10 of the total diode system 25 passing through is always totally reflected in prism 17. In addition, several such prisms 17 can be arranged parallel to one another in such fashion that several prism segments extend over the total length in the x direction of laser diode bars 14, which is not shown in the figures however. As a result, an even greater homogeneity of the power density distribution is achieved. Prism 17 that tapers wedgewise is placed in the beam path of the radiation source in order to achieve an intensity distribution of laser radiation 10 that is as uniform as possible along joint line 4 in gap plane 11. Local fluctuations of any kind in the homogeneity of the power density distribution at the rectangular beam cross section lead to inhomogeneous temperature distribution along joint line 4 and thus, especially in bonding, produce areas that are either melted together or are not joined. As a result of prism 17 that tapers wedgewise, the superposition of the partial beams and the homogeneity of the radiation are especially promoted.

Laser radiation 10 that leaves the exit aperture 20 of prism 17 is guided through a cylindrical lens 18, likewise in bar form, to form a rectangular beam cross section 22. Cylindrical lens 18 extends at least over the entire length of laser diode bars 14 arranged side by side and also captures all the laser radiation from the heightwise extent of laser diode bars 14 that are stacked one above the other. The rectangular beam cross section 22 not only has a length in the y direction but also a heightwise extension in the z direction that gives it its rectangular shape. The heightwise extent in the z direction of the rectangular beam cross section 22 depends on the selected focal distances and imaging quality of the optics. For example, with a focal distance for the microlenses of 1 mm and a focal distance of the cylindrical lens of 100 mm, the extent of the rectangular beam cross section that is reached in the z direction is 500 mm. As a result of this extent of rectangular beam cross section 22 in the z direction, the radiation source according to the invention or the laser radiation produced thereby, by virtue of this rectangular beam cross section 22, can heat only locally limited zones of limited depth at the two surfaces 8 and 9 of metal plates 1 and 2 to be bonded, so that the materials of the two surfaces 8, 9 to be joined remain precisely in the plastic state that is required for joining. Control of this plastic state of surfaces 8, 9 of the two metal plates 1, 2 to be joined is influenced by changing the feed rate 23 (see the arrow in FIG. 1) of the two metal plates 1 and 2 to be bonded and/or changing the laser radiation emitted from complete laser diode system 25.

Figure 4:
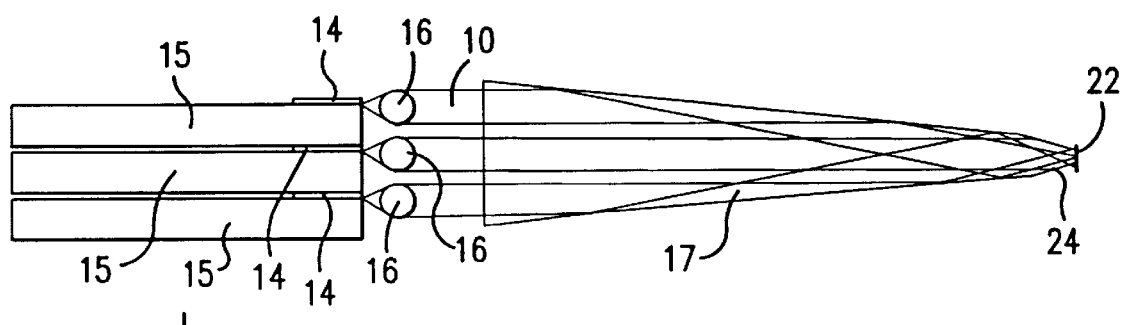
FIG. 4 is a side view of a radiation source according to FIG. 2 with a half-cylindrical end area of the prism.
Figure 5:
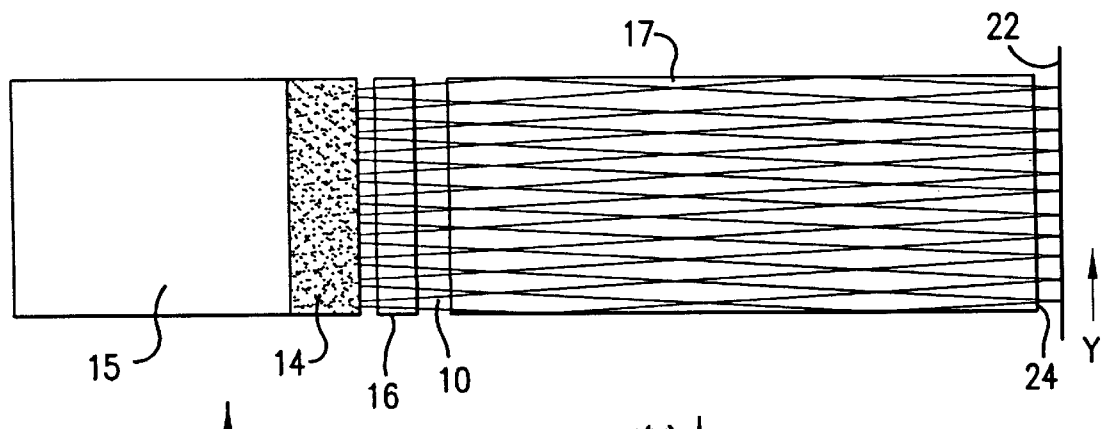
FIG. 5 is a top view of FIG. 4.
Figure 5A:
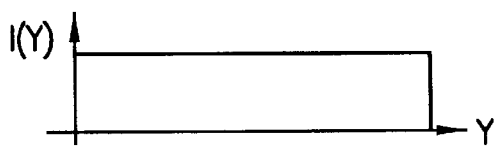

Instead of a cylindrical lens 18 in bar form, the exit aperture 20 or the exit area of the wedge-shaped tapering prism 17 directed at joint 3 can be made in the form of a half-cylindrical end area 24. The laser radiation 10 that passes through prism 17 is bundled by the half-cylindrical end area 24 of prism 17 likewise in a rectangular beam cross section 22 directed at joint 3; see also the corresponding side view in FIG. 4 and top view in FIG. 5.

Figure 6:
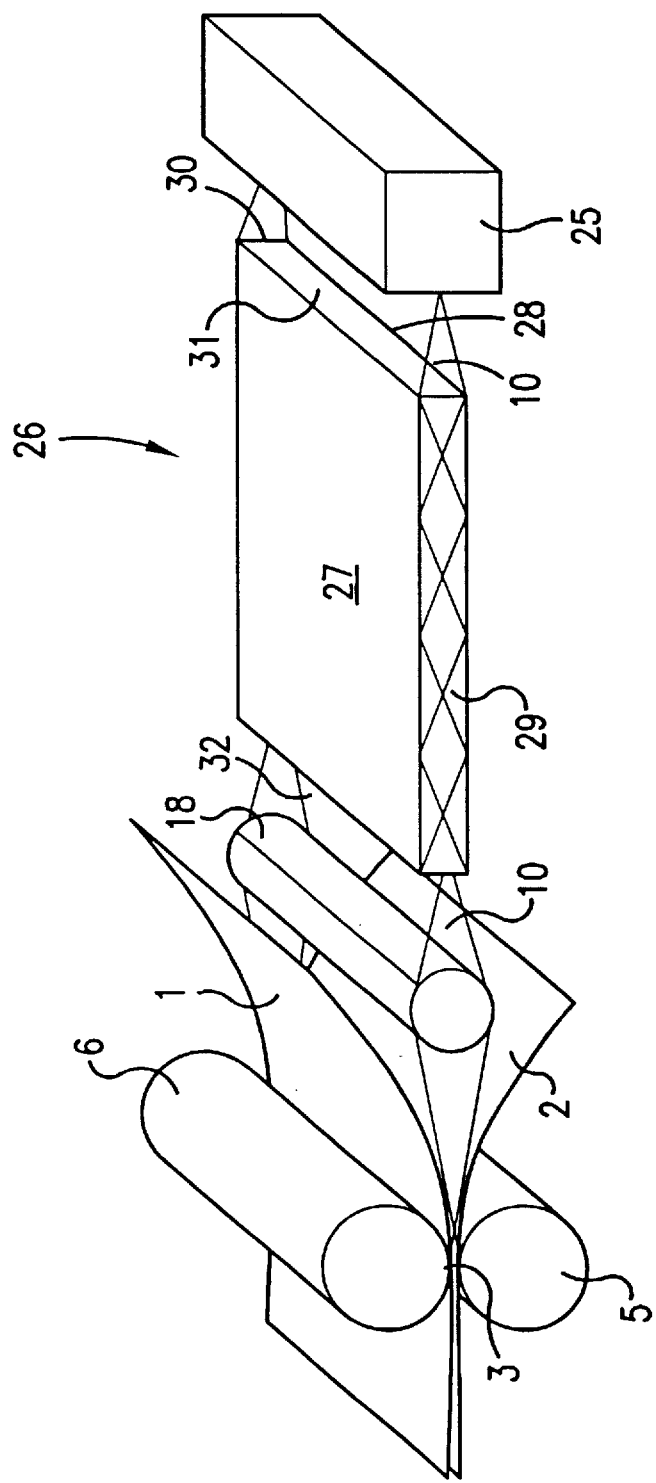
Figure 7:
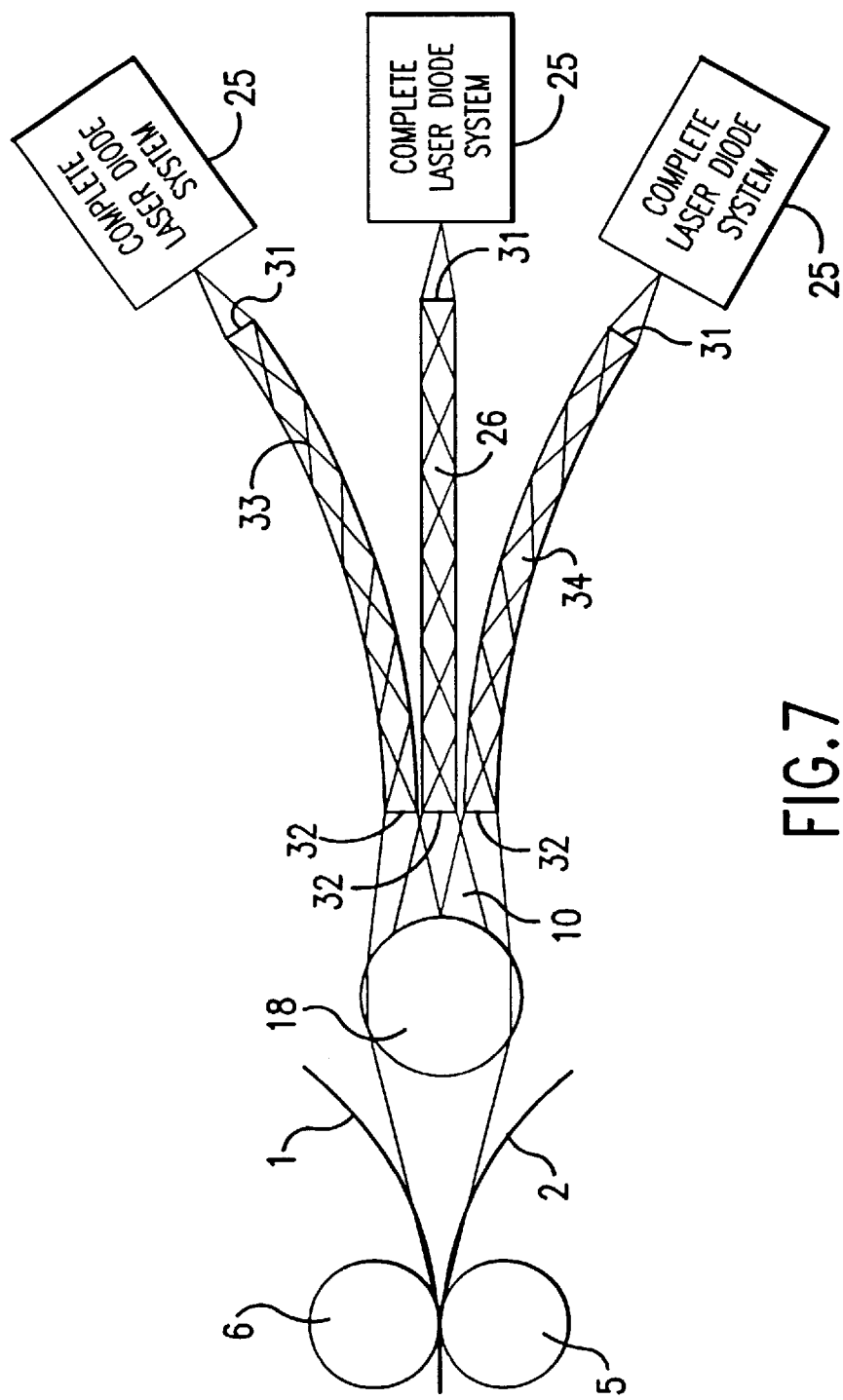
FIG. 7 shows the device according to FIG. 6 with a plurality of glass plates and complete diode systems.

FIG. 6 shows a schematic diagram of a second device for bonding according to the invention in which, between complete diode system 25 and joint 3, instead of a prism that tapers wedgewise, a glass plate 26 with a rectangular cross section is mounted and located in the x-y plane. In the second embodiment according to FIG. 6 and in the embodiment according to FIG. 7, the same parts and parts with the same functions as in the first embodiment in FIGS. 1 to 5 have been given the same reference numbers. Identical parts and functions in the two embodiments according to FIGS. 6 and 7 are repeated only in abbreviated form since a detailed description has already been provided for the first embodiment. In the second embodiment as well, the laser radiation is shaped to form a beam with a rectangular beam cross section 22. The laser radiation 10 runs parallel to gap plane 11 in the x-y plane, formed by boundary lines 12 and 13; see FIG. 1. Laser radiation 10 is also directed perpendicularly to joint line 4. The polarized laser radiation oscillates parallel to gap plane 11 in the x-y plane at joint 3. Metal plates 1 and 2 to be joined are again pressed together by rollers 5 and 6 at joint 3. Once again a complete laser diode system 25 is used as the radiation source, in which laser radiation 10 is always formed by a plurality of laser diodes arranged side by side in rows in a plane to form laser diode bars 14. The laser diode bars are arranged side by side in the lengthwise direction to achieve a length that is defined by the individual application, and are also capable of being stacked one above the other heightwise in order to increase the radiated power.

According to FIG. 6, laser radiation 10 that is emitted from complete laser diode system 25 is supplied directly to a glass plate 26 with a rectangular cross section. Between entrance aperture 31 and exit aperture 32, laser radiation 10 passing through the lengthwise direction in glass plate 26 with a rectangular cross section is totally reflected. The four long sides of glass plate 26 with a rectangular cross section, in other words the top 27 and the bottom 28, as well as the two lateral surfaces 29 and 30 are provided with a mirror coating for this purpose for example. Glass plate 26 with a rectangular cross section therefore acts as an integrator, increasing the homogeneity of laser radiation 10 passing through. In the glass plate with the rectangular cross section, the reflections of the laser radiation therefore take place on all four long sides.

The width of glass plate 26 in the y direction, said plate having a rectangular cross section, extends in the y direction over the entire length of complete laser diode system 25 and also for the length in the z direction of glass plate 26 that corresponds to the height of laser diode bars 14 stacked one above the other in the z direction. A cylindrical lens 18 made in bar form is provided to form rectangular beam cross section 22 downstream from exit aperture 32 of glass plate 26 with a rectangular cross section, said lens extending at least over the entire length and height of laser diode bars 14 or stacks thereof that are arranged side by side. The rectangular beam cross section 22 of laser radiation 10 however can also be formed by the exit surface 32 of glass plate 26 directed at joint 3 being made as a half-cylindrical end surface, but this is not shown in the figures. Moreover, additionally and optionally, entrance surface 31 of glass plate 26 can also be made curved, which is likewise not shown. The half-cylindrical end surface or curved entrance surface will extend at least over the entire length and height of the laser diode bars 14 or stacks thereof that are arranged side by side.

FIG. 7 shows the second embodiment of the invention in conjunction with a plurality of glass plates. Here, two curved glass plates 33 and 34 with a rectangular cross section and a straight glass plate 26 are joined for the purpose of providing a higher power in rectangular beam cross section 22. Each entrance aperture 31 of glass plates 26, 33, and 34 has associated with it, complete laser diode systems 25 as described above. The exit apertures 32 of the three glass plates are brought together in such fashion that they are aimed jointly at a cylindrical lens 18. The glass plates with rectangular cross sections therefore are stacked one above the other and the laser radiation 10 that emerges from the glass plates is fed to a cylindrical lens 18 that is common to them and is made in bar form to produce a single common rectangular beam cross section 22. Of course, more than three glass plates with rectangular cross sections can be assembled and thus produce a very high power in the rectangular beam cross section for bonding.

Instead of the radiated laser radiation from the complete laser diode systems 25 being fed directly to entrance apertures 31 of glass plates 26, 33, and 34 with rectangular cross sections, cylindrical microlenses can be connected between complete laser diode systems 25 and glass plates 26, 33, and 34 with rectangular cross sections for additional collimation, said lenses being positioned perpendicularly to the active radiating layer of the laser diodes, but this is not shown in the figures, however. A common cylindrical microlens 16 made in bar form is provided for all of the laser diode bars 14 arranged side by side in a plane. The lengths of cylindrical microlenses 16 correspond to the total length of laser diode bars 14 on the respective plane.

In order to increase further the uniform intensity distribution of the laser radiation in rectangular beam cross section 22, ultrasonic transducers can be mounted on the sides of glass plates 26, 33, and 34. These ultrasonic transducers generate a gate-like noise and thus deflect the diode radiation. Changing this deflection at high frequency causes the beam profile to oscillate. As a result, any inhomogeneities in the intensity distribution that develop can be compensated timewise. In this way, molten or non-joined zones of surfaces 8, 9 of metal plates 1 and 2 to be bonded can be avoided.

Figure 8:
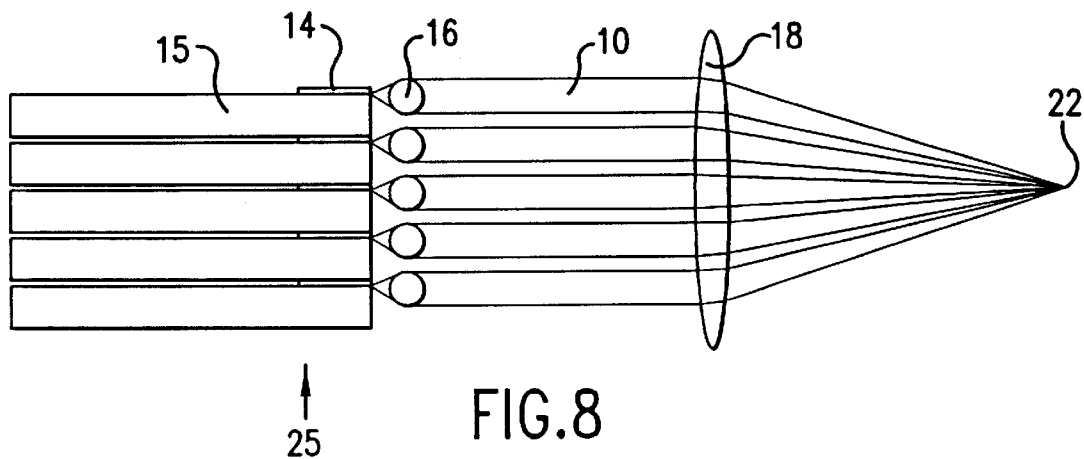
FIG. 8 is a schematic diagram in a side view of a third device according to the invention for bonding, with the complete laser diode system.
Figure 9:
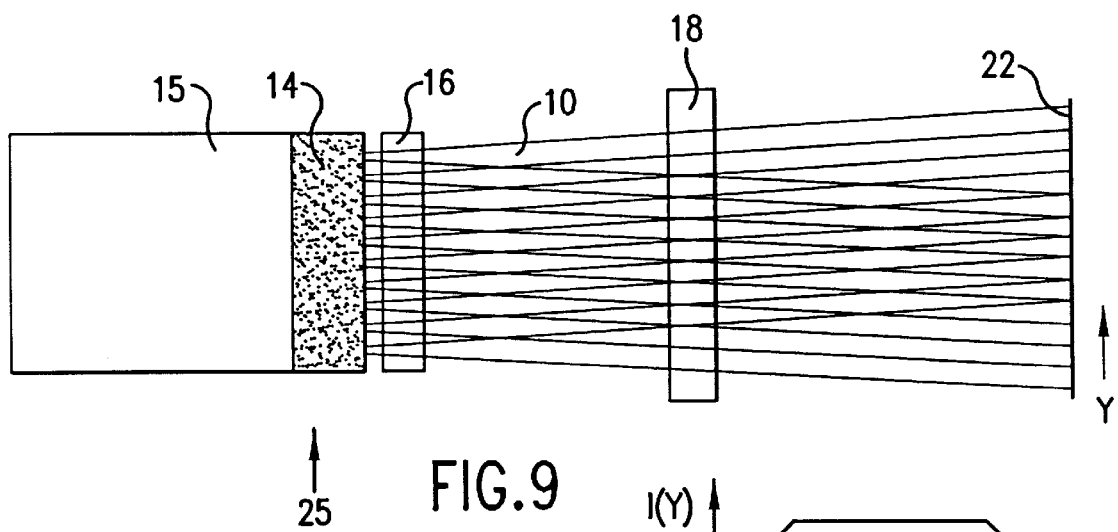
FIG. 9 is a top view of FIG. 8.
Figure 9A:
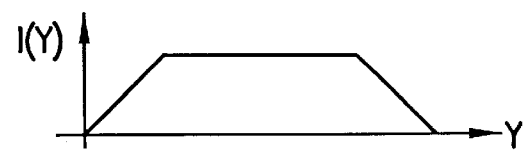
Figure 10:
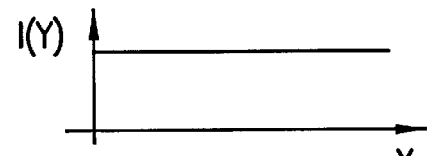
FIG. 10 is a device according to FIG. 8 with the complete laser diode system being provided with lateral reflecting limiting devices.
Figure 10:
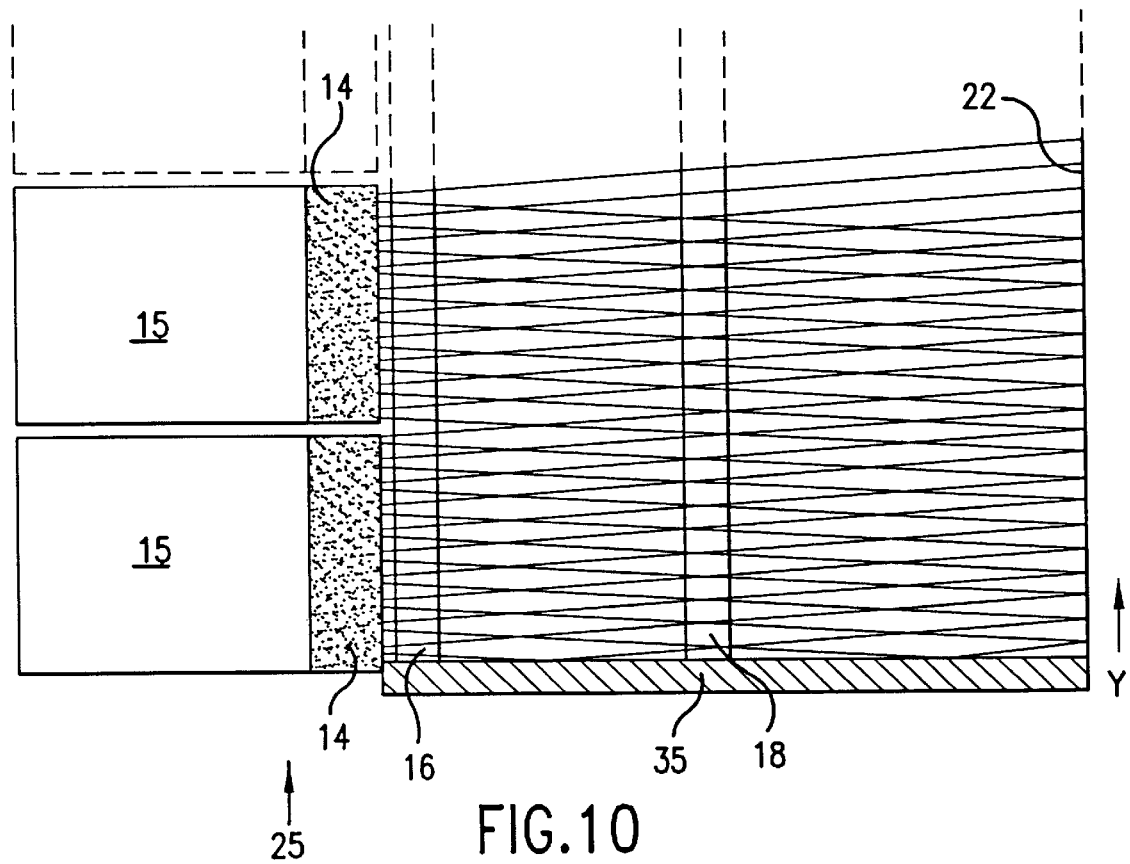

FIGS. 8, 9, and 10 show a schematic diagram in a side view and a top view of a third device according to the invention for bonding with a complete laser diode system. Parts and functions that are equivalent to those in the first embodiment shown in FIGS. 1 to 5 have been given the same reference numbers and are explained only briefly.

The third device according to the invention differs from the first device essentially in that instead of a prism that tapers wedgewise, reflecting limiting devices 35 are provided for laser radiation 10. In the third embodiment as well, laser radiation 10 travels essentially parallel to gap plane 11 in the x-y plane at joint 3. The laser radiation is directed essentially perpendicularly to joint line 4 and in the case of polarized radiation, oscillates primarily parallel to gap plane 11 in the x-y plane at joint 3.

Here again, metal plates 1 and 2 to be bonded are pressed together in the heating zone at joint 3 or joint line 4 by means of two rollers 5 and 6 with rolling force 7, with the rolling device and all the additional equipment for bonding being omitted for the sake of clarity.

Once again, laser diodes are used as the radiation source. The laser diodes form a complete laser diode system 25 such that laser radiation 10 is always formed by a plurality of laser diodes lined up side by side in a plane to form laser diode bars 14. Laser diode bars 14 are arranged in the lengthwise direction for a length that is defined by the individual application and are also stacked one above the other. The laser radiation 10 that is emitted on each plane containing laser diode bars 14 composed of laser diodes is conducted for collimation through cylindrical microlenses 16 arranged perpendicularly to the active radiating layer of the diodes. One common microlens 16 that is cylindrical and made in the shape of a bar is provided for all of the laser diode bars 14 located side by side in a plane. The length of cylindrical microlens 16 corresponds to the total length of laser diode bars 14 in this plane. The radiation that emerges through microlenses 16 from the complete laser diode system is then supplied to a cylindrical lens 18 that is also in bar form to generate rectangular beam cross section 22, said lens forming rectangular beam cross section 22. Cylindrical lens 18 extends over the entire length and height of laser diode bars 14 or stacks thereof that are arranged side by side. As a result of the formation of rectangular beam cross section 22, laser radiation 10, due to the rectangular beam cross section, heats only locally limited zones of limited depth on the two surfaces 8, 9 of metal plates 1 and 2 to be bonded in the plastic state.

As can be seen from the drawing of laser radiation 10 in FIG. 9, the laser radiation that is emitted from the diodes in laser diode bars 14 is irradiated at an angle of <30° in the plane parallel to the active laser diode layer. This means that a drop occurs in the intensity of the radiation at the ends of rectangular beam cross section 22; see FIGS. 9 and 10. The intensity of the radiation along rectangular beam cross section 22 is shown in a small graph. In order to avoid this drop in intensity of rectangular beam cross section 22 at the ends of the focus, reflecting limiting devices 35 are provided that eliminate this drop in intensity of laser radiation 10 by reflection. In FIG. 10, a limiting device 35 of this type is shown which for example can consist of a mirrored surface or any other means suitable for producing such reflection. From FIG. 10 and the laser diode bars 14 composed of laser diodes shown therein, it is evident that two or any number of laser diode bars 14 can be arranged side by side in a plane in order thus to produce a rectangular beam cross section that exceeds the meter limit. At the other end of the laser diode bars, not shown here, a reflecting limiting device 35 is also provided.

In the third as well as the first and second embodiments, by absorption of laser radiation 10 in the area a short distance ahead of joint line 4 of metal plates 1 and 2 brought together to form a V-shaped gap and its conversion into thermal energy, heating is produced in the area shortly ahead of the joint line. As a result, surfaces 8, 9 of metal plates 1 and 2 to be joined are changed to a plastic state. At the same time, a homogeneous joining of the two metal plates 1 and 2 is achieved by the pressure of rollers 5 and 6 at joint 3. The temperature in this area a short distance ahead of the joint line is supposed to be significantly below the melting point of metal plates 1 and 2 or the base and coating materials so that melting of the metal plates is prevented.

Figure 16:
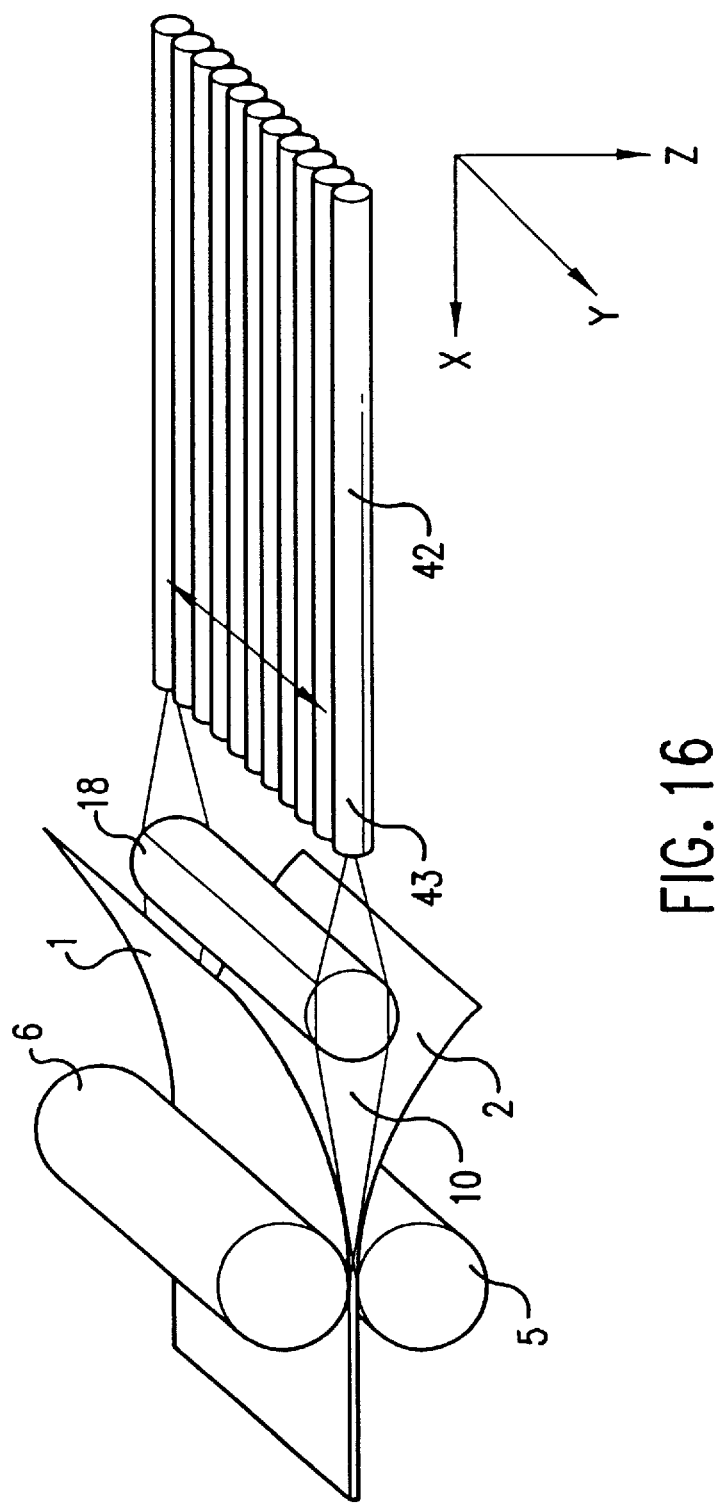
FIG. 16 is a schematic diagram of a fourth device according to the invention for bonding with a light guide fiber bundle.

In FIG. 16, in a partial perspective view, the principle of a fourth device according to the invention for bonding is shown, with a special light guide fiber bundle described in greater detail being provided to homogenize the power density distribution of the laser radiation. In the fourth device according to the invention as well, by means of beam-forming optical means, the laser radiation is shaped into a beam with a rectangular cross section. This laser radiation again is perpendicular to joint line 4. Metal plates 1 and 2 to be bonded are pressed together directly at joint 3 or joint line 4 by pressure 7 of two rollers 5 and 6. Laser diodes are again used as the radiation source, and laser radiation 10 from these diodes is always formed by a plurality of laser diodes arranged side by side to form laser diode bars 14 in a plane. Laser diode bars 14 are arranged both lengthwise, in other words in the y direction, for a length that is defined by the individual application, and are also stacked one above the other in the z direction, thus forming complete laser diode system 25. The laser radiation 10 emitted by complete laser diode system 25 is fed directly to a first light guide fiber bundle 42. The first light guide fiber bundle 42 is designed as a linear fiber bundle with light guides arranged parallel side by side. The light guides in said first light guide fiber bundle 42, at their ends 43 that face metal plates 1 and 2 to be bonded, are joined rigidly together a short distance before leaving cylindrical lens 18. End 43 of first light guide fiber bundle 42 is surrounded by means for generating high-frequency mechanical oscillations. In other words, the light guides that are rigidly joined together at end 43 of first light guide fiber bundle 42 are jointly excited to produce high-frequency oscillations. The deflections of these mechanical oscillations of end 43 of light guide fiber bundle 42 are designed so that the formation of the laser radiation of a light guide fiber at joint 3 or joint line 4 by oscillation overlaps the area of at least one additional image of another light guide fiber. By this oscillation of end 43 of light guide fiber bundle 42, a situation is created at the joint line such that the laser radiation transmitted in the light guide fibers is homogenized locally in the vicinity of the heating of the two metal plates 1 and 2. The high-frequency mechanical oscillations of end 43 can be produced for example by using piezo crystals, by using electromagnetic means, or by any other means suitable for generating such high-frequency oscillation. In the course of the formation of laser radiation 10 with a rectangular beam cross section and with only a limited height in the z direction, only a locally limited zone with a small depth is heated at the two surfaces 8 and 9 to bond metal plates 1 and 2 to be joined while in the plastic state. The high-frequency mechanical oscillations at end 43 of light guide fiber bundle 42 then occur at an angle of 90° to the direction of the laser radiation, in other words in the z direction, and simultaneously in the plane itself that is spanned by the direction of the light guide fiber bundle, in other words in the x-y plane. If end 43 of light guide fiber bundle 42 is allowed to oscillate uniformly, it produces a homogenizing effect on the laser radiation or the temperature profile.

In all of the embodiments of the device according to the invention that have been discussed thus far, the radiation source can be separated spatially from the devices for homogenizing laser radiation 10. In this way, the radiation source or the laser diode complete system 25 may not be located where the laser beam 10 is focused. For this purpose, between total laser diode system 25 or microlens 16 located in front thereof on the one hand and prism 17 that tapers to a wedge or the glass plate with a rectangular cross section 26 or the system of reflecting limiting devices 25 on the other, a second light guide fiber bundle 44 is provided for transporting laser beams 10 over long distances. The second light guide fiber bundle 44 is not shown in the figures, however.

Figure 11:
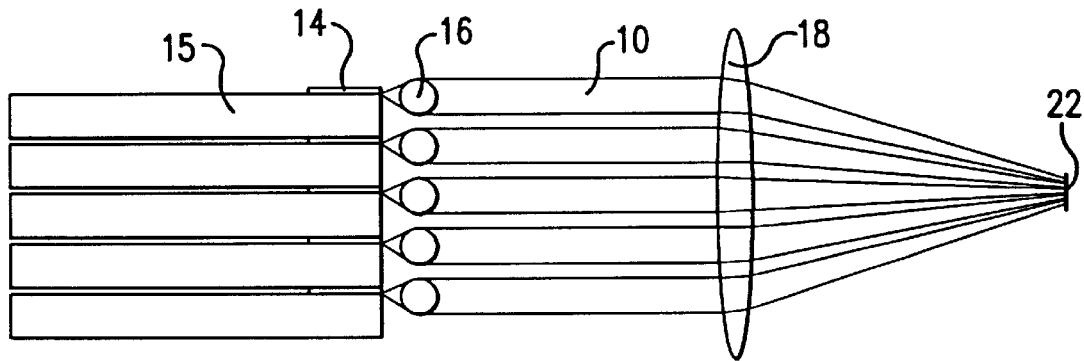
FIG. 11 shows the device according to FIG. 8 in a side view with variable intensity of the laser radiation in the area outside the focus.
Figure 11A:
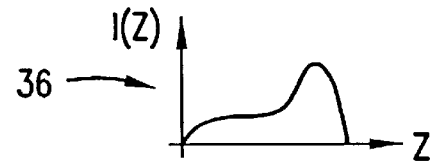
Figure 12:
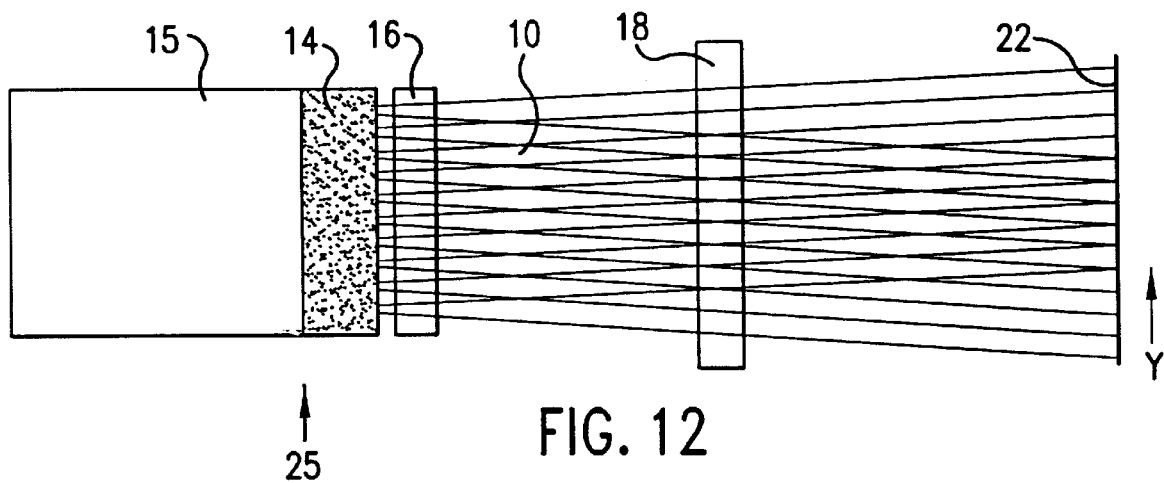
FIG. 12 is a top view of FIG. 11.

While as a rule the homogeneity of the power density distribution of the laser radiation on the rectangular beam cross section is critical for bonding, in special cases a nonuniform distribution of the intensity of the laser radiation outside the focus may be necessary. In FIGS. 11 and 12, the third embodiment according to FIG. 8 can be seen in a side view and a top view, with a variable intensity of the laser radiation in the area outside the focus. As already explained in connection with the first embodiment, rectangular beam cross section 22 also has a certain spatial height in the z direction which is necessary in order to heat the two surfaces 8, 9 of metal plates 1 and 2 to be joined in the area shortly in front of joint line 4 and to change them to the plastic state. The collimated radiation 10 can be shaped by a special adjustment of cylindrical microlenses 16 or by a suitable, nonuniform distribution of the laser diodes or laser diode bars 14 over the height of the stack. An increase in focal distance is produced by these cylindrical microlenses 16, so that a plurality of intensity profiles can be obtained; see the graph of the intensity distribution versus the length of the rectangular beam cross section 22 in circle 36 in FIG. 11. As a result of the nonuniform distribution of the laser diodes or laser diode bars 14 over the height of the stack, the distribution at the focus is unaffected but variable distributions in intensity take place in the defocused areas in front of and behind it.

Figure 13:
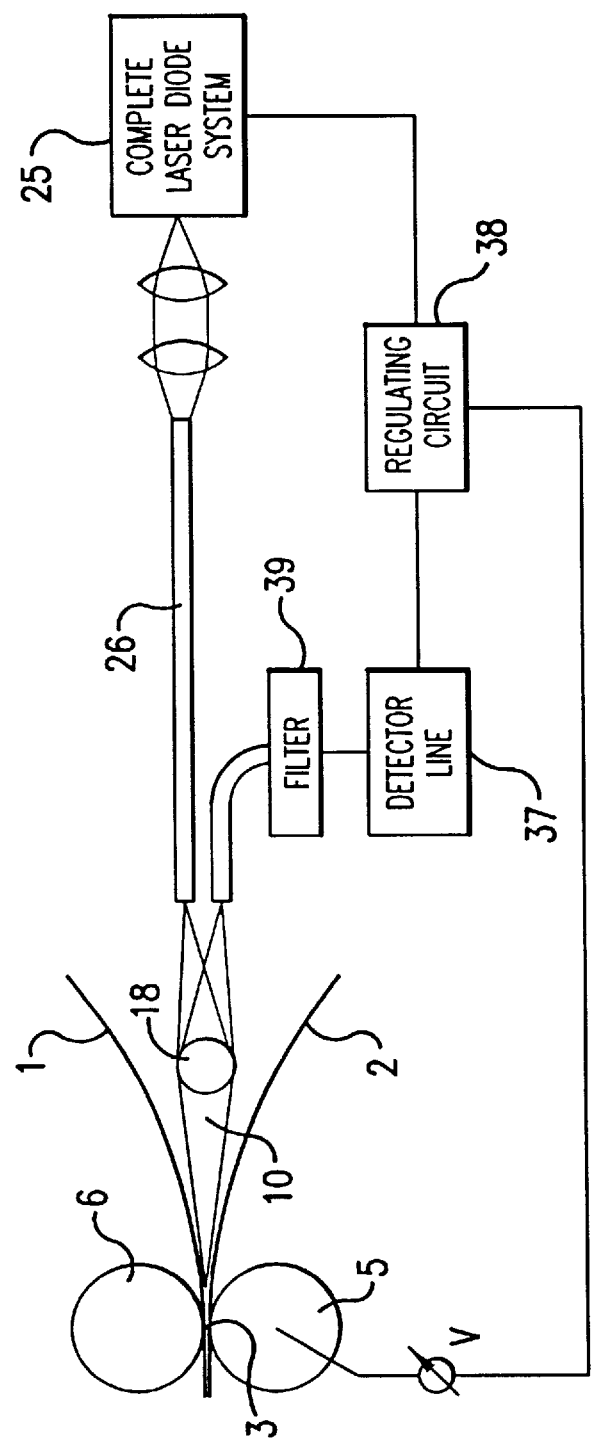
FIG. 13 is a measuring device with a regulating circuit connected downstream for the bonding process.

In the first, second, or third embodiments, if a cylindrical lens 18 is placed in front of joint 3, with the cylindrical lens producing a rectangular beam cross section 22 at joint 3 or joint line 4, by means of cylindrical lens 18, the heat radiation of this gap can be used to measure the actual temperature of joint 3 or joint line 4 and the area located immediately in front of this point; see FIG. 13. The heat radiation decoupled from cylindrical lens 18 around the bonding location is fed to a detector line 37 to generate a temperature-proportional signal. Between detector line 37 and cylindrical lens 18 a filter 39 is inserted whose purpose is to keep the diode light reflected from joint 3 or the joint line away from detector line 37. The signal from detector line 37, to compare the desired temperature at joint 3 or joint line 4 with the actual temperature, is fed to a regulating circuit 38 to change the power of the complete laser diode system 25 and/or to change the feed rate of metal plates 1 and 2 through rollers 5 and 6 to control the specified bonding temperature and keep it within an admissible range. The length of detector line 37 and the length of cylindrical lens 18 correspond to the total length of joint line 4 so that measurement is possible over the entire bonding width of the two metal plates 1, 2.

Figure 14:
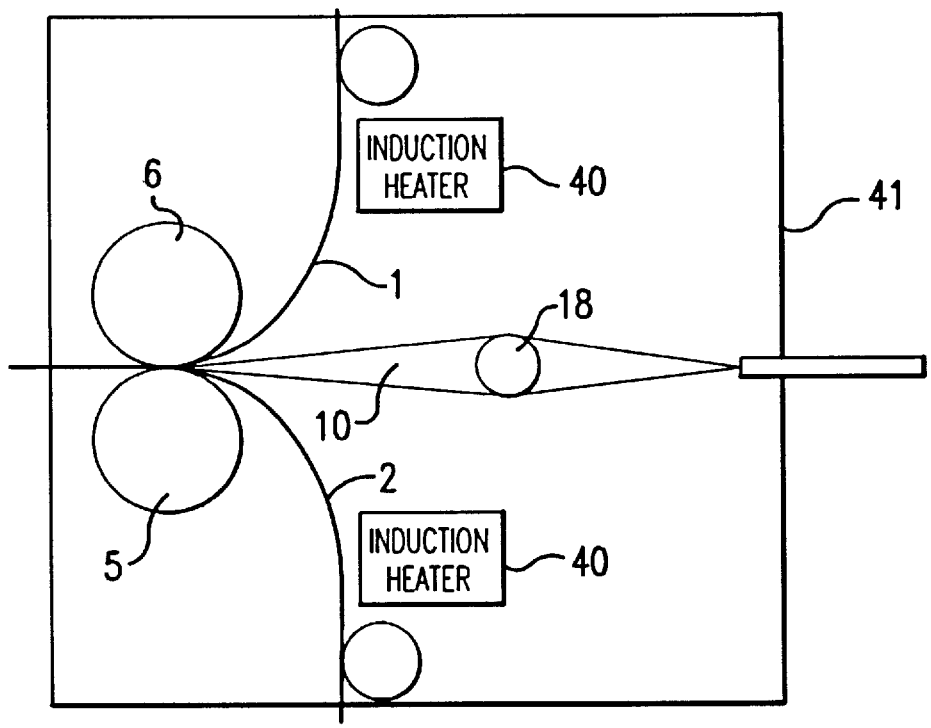
FIG. 14 shows a device for bonding according to the invention, with preheating of the metal plates to be joined.

The required power for laser radiation 10 of complete laser diode system 25 can be reduced by preheating metal plates 1 and 2 to be bonded at surfaces 8, 9 or the interiors to be joined shortly before joining and feeding them into laser radiation 10 by band-shaped induction heaters 40; see FIG. 14. During preheating of this kind, using induction heating, the area in which joining takes place is flushed with protective gas. Argon or any other gas suitable for such purposes can be used as the protective gas. Bonding takes place with preheating and flushing with protective gas, advantageously in a protective gas chamber 41.

Figure 15:
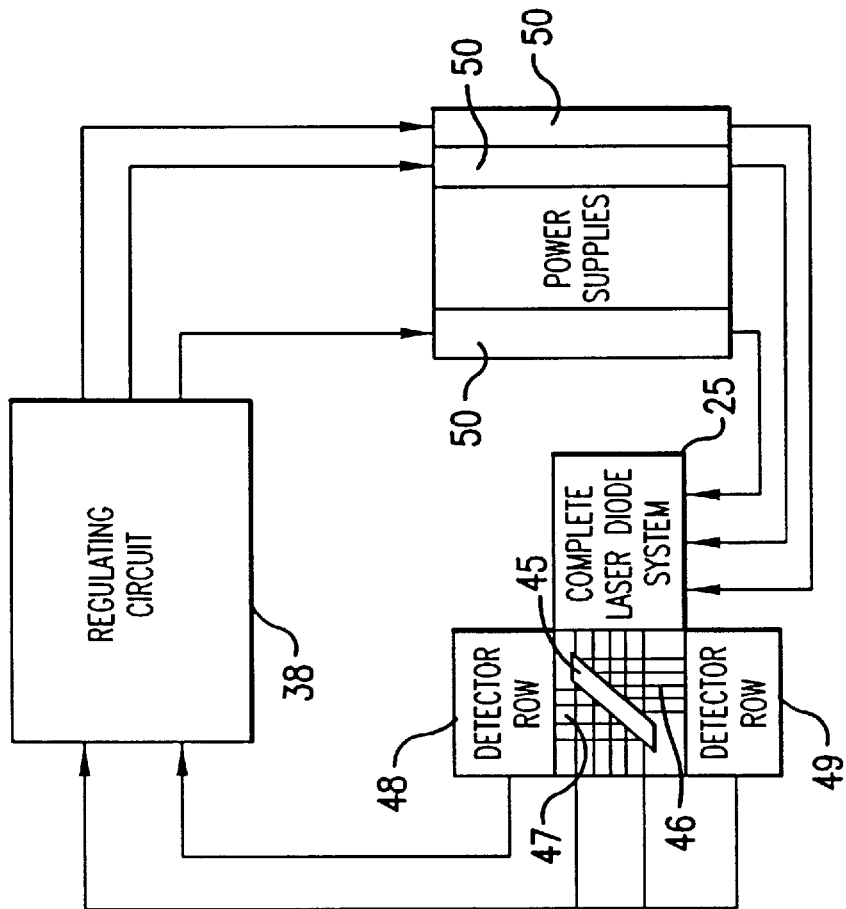
FIG. 15 is another measuring device for the bonding process.

Changes in the power density distribution of laser radiation 10 with a rectangular beam cross section or a change in the temperature distribution caused by this laser radiation at joint 3 or joint line 4 of metal plates 1 and 2 to be bonded are made by controlling the laser diode output power of complete laser diode system 25. As already shown in the case of FIG. 13, the bonding process is monitored by suitable measuring devices. An additional measuring device for the bonding process is shown in FIG. 15. The complete laser diode system 25 generates laser power 10. Looking in the radiation direction of laser radiation 10 toward the metal plates to be bonded, a partially transparent mirror 45 is located in front of complete laser diode system 25. It is evident from the schematic diagram of partially transparent mirror 45 and its position with respect to complete laser diode system 25 that laser radiation 10 that comes from complete laser diode system 25 is locally decoupled and in this way a determination of the areawise distribution of laser radiation 10 is possible. Only a small fraction 46 of laser radiation 10 is decoupled and detected by a detector row 49 for the laser radiation coming from complete laser diode system 25 and is converted into a measuring signal.

A fraction 47 of the laser radiation reflected from joint 3 or joint line 4 can also be detected with partially transparent mirror 45. Fraction 47 of the reflected radiation is fed to a detector row 48 for detecting the radiation reflected from the joint line, generating an appropriate signal. The laser radiation reflected from joint 3 or joint line 4 is likewise detected in accordance with its spatial distribution, resulting in a corresponding two-dimensional image of joint 3 or joint line 4. For an exact determination of the radiation reflected from joint line 4, it is advantageous to decouple the reflected fraction 46 of the laser radiation, looking in the emission direction of the reflected radiation from joint 3, in the immediate vicinity downstream from cylindrical lens 18.

Just as in the measuring device in FIG. 13, in the measuring device in FIG. 15 the signals generated by detector row 48 for the laser radiation reflected from the joint and the signals generated by detector row 49 for the laser radiation 10 coming from the complete laser diode system 25 are fed to a regulating circuit 38. The actual values thus measured are compared with the respective desired values and then a change is made in the output power of complete laser diode system 25. This is accomplished by suitable control of power supplies 50 of which only three are shown here for example, which in turn control the laser diode bars of complete laser diode system 25 accordingly. The respective laser radiation values can be detected at very short time intervals so that correspondingly short-term control, i.e. the type that takes place on line, of the output power of complete laser diode system 25 is possible.

We claim:

1. Device for bonding at least two metal plates by absorption of laser radiation shaped into a beam with a rectangular beam cross section, said beam being directed perpendicularly to a joint, and with the metal plates to be bonded being pressed together directly at the joint by at least two rollers, wherein said beam is formed by a plurality of laser diodes arranged in rows side by side in an x-y plane to form laser diode bars, wherein said laser diode bars are arranged in a y direction of said x-y plane for a total length that is defined by an individual application, and said laser diode bars are stacked above one another in a z direction perpendicular to said x-y plane, forming a complete laser diode system, wherein said laser radiation emerging in said x-y plane of each of said laser diode bars is conducted for collimation by cylindrical microlenses arranged perpendicularly to an active radiating layer of said laser diodes, wherein one of said cylindrical microlenses is provided for all of said laser diode bars arranged in rows side by side in said x-y plane, said cylindrical microlenses being in bar form and made integral or segmented, and wherein a length of the cylindrical microlenses in the y direction corresponds to the total length of said laser diode bars in the y direction, wherein said cylindrical microlenses are followed by at least one prism tapering wedgewise, said at least one prism being arranged parallel side by side in segments and in the direction of said joint of said metal plates to be bonded, wherein an entrance aperture, an exit aperture, and a length of said at least one prism are made so that the laser radiation passing through is reflected totally in said at least one prism, and wherein heat passes through said metal plates such that said laser radiation, due to said rectangular beam cross section, causes only locally limited zones with a limited depth to enter a plastic state at two surfaces of said metal plates to be bonded.

2. Device according to claim 1 wherein a further cylindrical lens made in bar form is arranged between said at least one prism and said joint, said further cylindrical lens extending over at least the total length or height in the y and z directions of the laser diode bars, to form said rectangular beam cross section.

3. Device according to claim 1 wherein the exit aperture, facing said joint, of said at least one prism that tapers wedgewise is made in the form of a half-cylindrical end face to generate said rectangular beam cross section.

4. Device according to claim 2 wherein a portion of said laser radiation reflected at said joint is decoupled by said further cylindrical lens to measure the actual temperature and wherein the heat is fed to a detector line to generate a signal that is proportional to the temperature.

5. Device according to claim 4 wherein a filter for the reflected laser radiation is located between said further cylindrical lens and said detector line.

6. Device according to claim 4 wherein the signal of said detector line is fed to a regulating circuit for comparison with a desired temperature to at least one of: (a) change the power of said complete laser diode system, and (b) change a feed rate of said metal plates for controlling a specified bonding temperature within an admissible range.

7. Device according to claim 4, wherein the length of said detector line and said further cylindrical lens in the y direction corresponds to the length of said joint in the y direction.

8. Device according to claim 4 wherein fractions of said laser radiation are decoupled from the beam path in the laser radiation of said complete laser diode system from said laser radiation reflected at said joint and supplied to said detector line, directly in the beam direction downstream from said complete laser diode system and facing the emission direction of the radiation reflected from the joint, downstream from said further cylindrical lens.

9. Device according to claim 1 wherein the power density distribution of said laser radiation can be changed outside of a focus area of the beam.

10. Device according to claim 1 wherein the power density distribution of said laser radiation is changed by mounting the cylindrical microlenses differently relative to the active radiating layer of the laser diodes.

11. Device according to claim 1 wherein the power density distribution of said laser radiation is changed by a nonuniform distribution of the laser diodes heightwise in the z direction of the stacks forming said complete laser diode system.

12. Device according to claim 1 wherein a light guide fiber bundle is provided between said complete laser diode system and said at least one prism that tapers wedgewise or a glass plate with a rectangular cross section or a system of reflecting limiting devices, for transporting the laser radiation from said complete laser diode system.

13. Device according to claim 1 wherein a change in the power density distribution of said laser radiation with a rectangular beam cross section or the temperature distribution caused by said laser radiation at said joint is monitored by controlling a laser diode output power produced by said complete laser diode system, the bonding process being monitored by measuring devices.

14. Device according to claim 1 wherein a partially transparent mirror located in the beam path of said laser radiation with a rectangular beam cross section decouples at least one of: (a) a fraction of the laser radiation conducted by the complete laser diode system to said joint, and (b) a fraction of the laser radiation reflected from said joint to detector rows.

15. Device according to claim 1 wherein said metal plates to be bonded are preheated on the two respective surfaces to be bonded by induction heaters in the shape of strips.

16. Device according to claim 1 wherein said joint is flushed with a protective gas and wherein bonding takes place in a protective gas chamber.

17. Device for bonding at least two metal plates by absorption of laser radiation shaped to form a beam with a rectangular beam cross section that is directed perpendicularly to a joint, and the metal plates to be bonded are pressed together directly at the joint by at least two rollers, wherein said beam is formed by a plurality of laser diodes arranged in rows side by side in an x-y plane to form laser diode bars, wherein said laser diode bars are arranged in a y direction of said x-y plane for a total length that is defined by an individual application, and said laser diode bars are stacked one above another in a z direction perpendicular to said x-y plane, forming a complete laser diode system, wherein said laser radiation emerging from said complete laser diode system is supplied directly to a glass plate extending longitudinally in said x-y plane, said glass plate having a rectangular cross section and having four longitudinal sides extending in an x direction of the x-y plane, said four longitudinal sides being mirrored such that total reflection takes place in the glass plate between entrance and exit apertures of the laser radiation passing through, wherein heat passes through said metal plates such that said rectangular beam cross section of said laser radiation converts into a plastic state only locally limited zones with a limited depth on two surfaces of said metal plates to be bonded.

18. Device according to claim 17 wherein, a cylindrical lens made in bar form extends at least over the total length or height in the y and z directions of said laser diode bars in order to form said rectangular beam cross section of said laser radiation.

19. Device according to claim 17 wherein the exit aperture of said glass plate facing said joint is made as a half-cylindrical end surface to form the rectangular beam cross section of said laser radiation, with the exit and entrance apertures extending at least over the total length and height in the y and z directions of the laser diode bars or stacks that are arranged side by side.

20. Device according to claim 17 wherein a plurality of said glass plates with a rectangular cross section, said plates being associated with a corresponding number of said complete laser diode systems, are stacked one above the other and said glass plates cooperate with a common cylindrical lens made in bar form to form a single common rectangular beam cross section of said laser radiation.

21. Device according to claim 17 wherein cylindrical microlenses arranged perpendicularly to an active radiating layer of said laser diodes are connected between said complete laser diode systems and the glass plates with rectangular cross sections for additional collimation, wherein one of said cylindrical microlenses made in bar form is provided for all of the laser diode bars arranged side by side in said x-y plane, and wherein a length in the y direction of each of the cylindrical microlenses corresponds to the total length of the laser diode bars in the x-y plane.

22. Device according to claim 17 wherein ultrasonic transducers are provided on the sides of the glass with the rectangular cross section for deflecting said laser radiation of said laser diodes.

23. Method for bonding at least two metal plates by absorbing laser radiation, with the laser radiation being converted by beam-forming optical means into a beam with a rectangular cross section, said beam being aligned perpendicularly to a joint line, and the metal plates to be bonded are pressed together in a heating zone directly at the joint line by two rollers of a rolling device, wherein the laser radiation is produced by a laser diode and passes through means for homogenizing the power density distribution and wherein when the laser radiation is treated in this fashion, only locally limited zones of limited depth on two surfaces of the metal plates to be bonded are heated to a plastic state.

24. Method according to claim 23 wherein devices for measuring the power density distribution of the laser radiation or the temperature distribution at the joint line caused by this laser radiation monitor the bonding process.

25. Method according to claim 24 wherein the bonding temperature is regulated in the admissible plastic range of the surfaces of the metal plates using the measured values determined, by at least one of: (a) changing the output power of the laser diode, and (b) changing a feed rate of the metal plates.

26. Method according to claim 23 wherein the surfaces of the metal plates to be bonded are preheated before they enter the joint line and are flushed with a protective gas.

27. Device for bonding at least two metal plates by absorption of laser radiation shaped to form a beam with a rectangular beam cross section, said beam being directed perpendicularly to a joint, and the metal plates to be bonded being pressed together directly at the joint by at least two rollers, wherein said beam is formed by a plurality of laser diodes arranged side by side in an x-y plane to form laser diode bars, wherein said laser diode bars are arranged in a y direction of said x-y plane for a total length that is defined by an individual application, said laser diode bars being stacked one above another in a z direction perpendicular to said x-y plane, thus forming a complete laser diode system, wherein said laser radiation formed on each x-y plane with said laser diode bars is conducted for collimation through cylindrical microlenses mounted perpendicularly to an active radiating layer of said laser diodes, wherein one of said cylindrical microlenses in bar form is provided for all of the laser diode bars located side by side in said x-y plane, and wherein length of the cylindrical microlenses in the y direction corresponds to the total length in the y direction of the laser diode bars in said x-y plane, wherein a further cylindrical lens made in bar form extends over the entire length or height in the y and z directions of the laser diode bars to form said rectangular cross section of laser radiation, wherein heat passes through said metal plates such that the laser radiation, due to said rectangular beam cross section, causes only locally limited zones with a limited depth, located on two surfaces of said metal plates to be bonded, to enter a plastic state, and wherein a limiting device that reflects laser radiation extends for a distance lengthwise in an x direction of the x-y plane of the complete laser diode system between the complete laser diode system and the rectangular beam cross section on both narrow sides.

28. Device according to claim 27 wherein said limiting device is a mirror.

29. Device according to claim 27 wherein the power density distribution of the laser radiation can be changed outside of a focus area of the beam.

30. Device according to claim 27 wherein the power density distribution of the laser radiation is changed by mounting the cylindrical microlenses differently relative to the active radiating layer of the laser diodes.

31. Device according to claim 27 wherein the power density distribution of the laser radiation is changed by a nonuniform distribution of the laser diodes heightwise in the z direction of the stacks of said complete laser diode system.

32. Device for bonding at least two metal plates by absorption of laser radiation shaped into a beam with a rectangular beam cross section that is directed perpendicularly to a joint, and with the metal plates to be bonded being pressed together directly at the joint by at least two rollers, wherein said beam is formed by a plurality of laser diodes arranged side by side in an x-y plane to form laser diode bars, wherein said laser diode bars are arranged in a y direction of said x-y plane that is defined by the individual case, said laser diode bars being stacked one above another in a z direction perpendicular to said x-y plane, thus forming a complete laser diode system, wherein the laser radiation coming from said complete laser diode system is supplied directly to at least one light guide fiber bundle, wherein a first of said at least one light guide fiber bundle is made in the form of a linear fiber bundle with light guides lying parallel side by side, wherein the light guides of the first light guide fiber bundle, at an end facing the metal plates to be bonded, are rigidly connected together shortly before emerging toward a cylindrical lens, and that means for generating high-frequency mechanical oscillations of said end are provided at said end of the first light guide fiber bundle, and wherein heat passes through said metal plates such that the laser radiation with the rectangular beam cross section causes only locally limited zones of a limited depth on two surfaces of metal plates to be bonded, to enter a plastic state.

33. Device according to claim 32 wherein the high-frequency mechanical oscillations of said end of said first light guide fiber bundle consist of oscillations in the z direction perpendicularly to a direction of the laser radiation in an x-direction of said x-y plane and simultaneously in an x-y plane spanned by said first light guide fiber bundle.

34. Device according to claim 32 wherein piezo crystals are used as said means for generating the high-frequency mechanical oscillations of said end of the first light guide fiber bundle.

35. Device according to claim 32 wherein electromagnetic means generate the high-frequency mechanical oscillations of said end of the first light guide fiber bundle.

36. Device according to claim 32 wherein deflection of the mechanical oscillations of said end of the first light guide fiber bundle is so designed that the imaging of the laser radiation of a light guide fiber at said joint by oscillation overlaps the area of at least one adjacent image of another light guide fiber.

* * * * *